(12) United States Patent
Pattok et al.

(10) Patent No.: US 10,844,909 B2
(45) Date of Patent: Nov. 24, 2020

(54) ELECTRIC POWER STEERING ASSEMBLY

(71) Applicant: STEERING SOLUTIONS IP HOLDING CORPORATION, Saginaw, MI (US)

(72) Inventors: Eric D. Pattok, Frankenmuth, MI (US); Sai S. Adimulam, Saginaw, MI (US); Bryan S. Kikta, Columbiaville, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 331 days.

(21) Appl. No.: 15/802,221

(22) Filed: Nov. 2, 2017

(65) Prior Publication Data

US 2019/0128332 A1    May 2, 2019

(51) Int. Cl.

| | |
|---|---|
| *F16D 3/06* | (2006.01) |
| *B21C 23/10* | (2006.01) |
| *B21K 1/12* | (2006.01) |
| *H02K 15/03* | (2006.01) |
| *B21C 37/20* | (2006.01) |
| *B62D 1/16* | (2006.01) |
| *B62D 5/04* | (2006.01) |
| *H02K 1/27* | (2006.01) |
| *H02K 1/30* | (2006.01) |
| *H02K 7/00* | (2006.01) |
| *H02K 1/28* | (2006.01) |

(52) U.S. Cl.
CPC ............... *F16D 3/06* (2013.01); *B21C 23/10* (2013.01); *B21C 37/202* (2013.01); *B21K 1/12* (2013.01); *B62D 1/16* (2013.01); *B62D 5/0415* (2013.01); *H02K 1/276* (2013.01); *H02K 1/30* (2013.01); *H02K 7/003* (2013.01); *H02K 15/03* (2013.01); *H02K 1/28* (2013.01); *Y10T 403/7026* (2015.01)

(58) Field of Classification Search
CPC ...... F16D 3/06; F16D 3/185; F16D 2001/103; B21C 23/10; B21C 37/202; B21K 1/12; H02K 15/03; H02K 1/276; H02K 1/30; H02K 7/003; H02K 1/28; B62D 1/16; B62D 5/0415; Y10T 403/7026
USPC ................................. 180/443, 444; 464/162
See application file for complete search history.

(56) References Cited

U.S. PATENT DOCUMENTS

| | | | |
|---|---|---|---|
| 5,230,658 A * | 7/1993 | Burton | ..................... F16D 3/848 |
| 8,388,455 B2 * | 3/2013 | Eltner | ....................... F16D 3/06 464/162 |
| 8,536,750 B2 * | 9/2013 | Ai | .......................... H02K 1/2793 |
| 9,193,378 B2 * | 11/2015 | Chae | ..................... B62D 5/0415 |

\* cited by examiner

*Primary Examiner* — Greg Binda
(74) *Attorney, Agent, or Firm* — Dickinson Wright LLC

(57) ABSTRACT

A method of assembling an electric power steering assembly includes providing a shaft that extends along a longitudinal axis between a first shaft end and a second shaft end. The method further includes extruding or drawing the shaft through a die to define a spline that extends between the first shaft end and the second shaft end. The spline includes a first tooth having a first tip. The method still further includes applying a sleeve over a portion of the spline, such that the sleeve extends from the second shaft end towards the first shaft end.

8 Claims, 6 Drawing Sheets

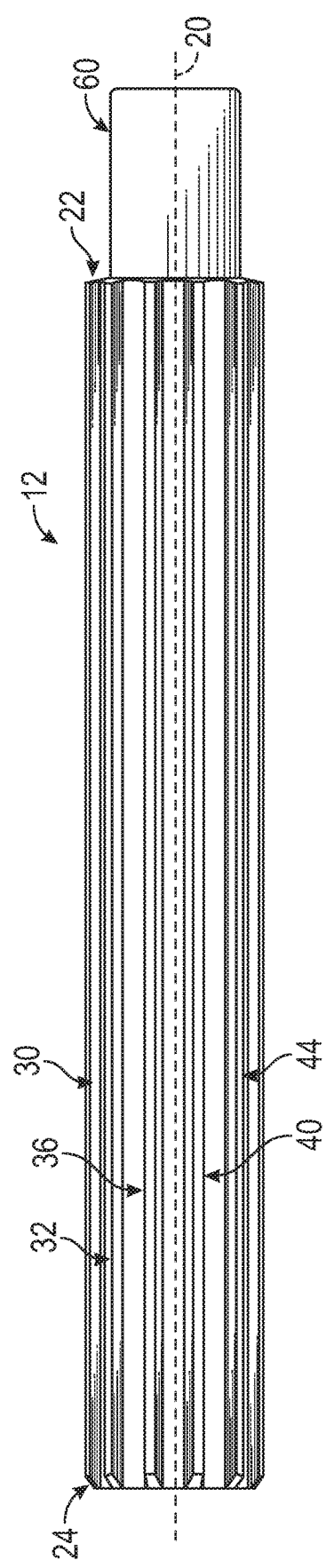
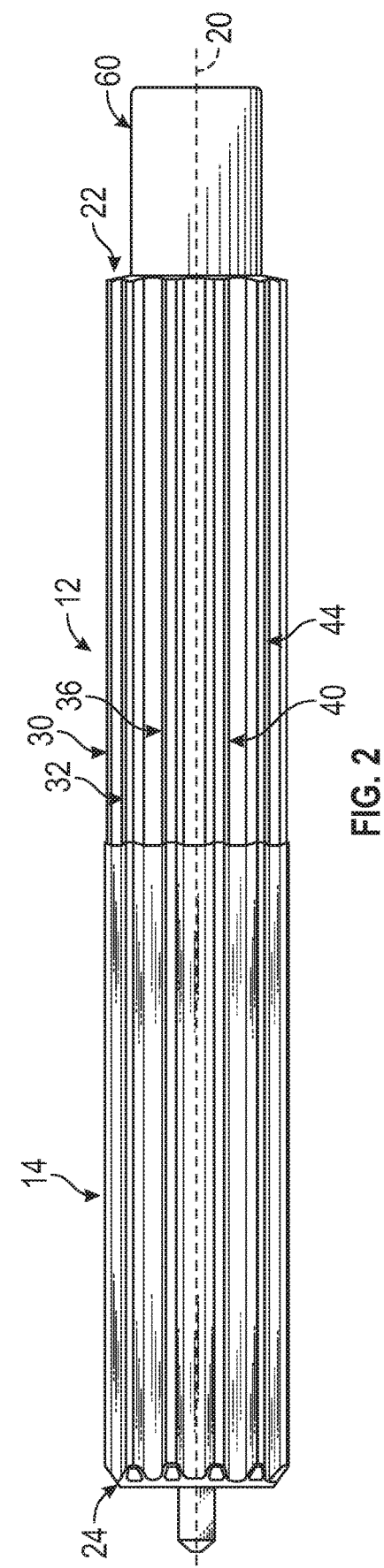
FIG. 1
FIG. 2

ELECTRIC POWER STEERING ASSEMBLY

BACKGROUND

Vehicles are provided with an electric power steering system that is arranged to provide a steering assist to aid an operator of the vehicle in turning or steering the vehicle. An electric motor may be drivably connected to a portion of the electric power steering system such as a steering shaft. The electric motor and the steering shaft may require that each component undergo multiple machining operations to ensure that the electric motor and the steering shaft are able to mate with each other.

Accordingly, it is desirable to reduce the complexity of the electric motor and the steering shaft to enable the electric motor steering shaft be made more easily.

SUMMARY

According to an embodiment of the present disclosure, an electric power steering assembly is provided. The electric power steering assembly includes a shaft and a sleeve. The shaft extends along a longitudinal axis between a first shaft end and a second shaft end. The shaft defines a spline that extends between the first shaft end and the second shaft end. The shaft has a constant cross-sectional form between the first shaft end and the second shaft end. The sleeve is disposed over a portion of the spline and extending from the second shaft end towards the first shaft end.

According to another embodiment, an electric power steering assembly. The electric power steering assembly includes a rotor assembly that is rotatable about a longitudinal axis. The rotor assembly has an outer surface and an inner surface. The rotor assembly defines a plurality of magnet pockets that are disposed proximate the outer surface. The inner surface defines a plurality of rotor teeth.

According to yet another embodiment, a method of assembling an electric power steering assembly is provided. The method includes providing a shaft that extends along a longitudinal axis between a first shaft end and a second shaft end. The method further includes extruding or drawing the shaft through a die to define a spline that extends between the first shaft end and the second shaft end. The spline includes a first tooth having a first tip. The method still further includes applying a sleeve over a portion of the spline, such that the sleeve extends from the second shaft end towards the first shaft end.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 1 is a side view of a shaft having a constant cross-sectional form;

FIG. 2 is a side view of the shaft having a sleeve applied to an end of the shaft;

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Referring to FIGS. 5-11, an electric power steering assembly 10 may be provided with a vehicle. The electric power steering assembly 10 includes a shaft 12, a sleeve 14, and a rotor assembly 16.

Figure 3:
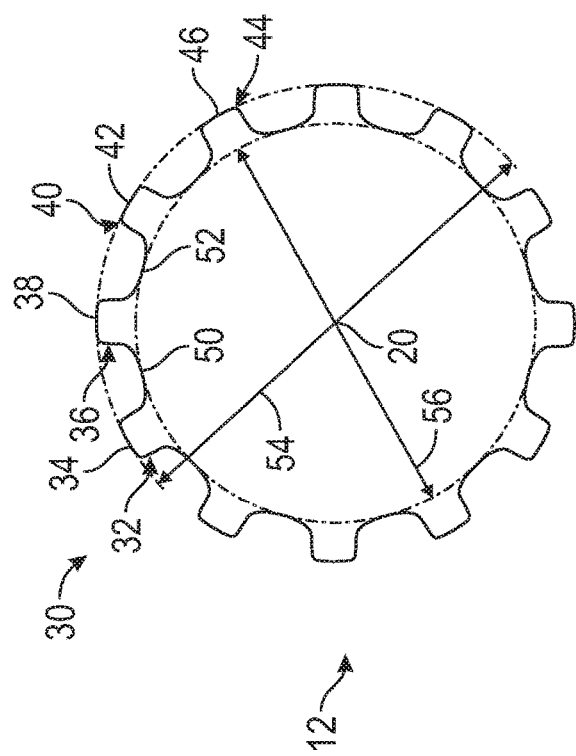
FIG. 3 is an end view of the shaft.

Referring to FIGS. 1-3, the shaft 12 may be at least one of an input shaft, an output shaft, or an intermediate shaft. The shaft 12 extends along a longitudinal axis 20 between a first shaft end 22 and a second shaft end 24. The shaft 12 is at least partially received within or extends through the rotor assembly 16 along the longitudinal axis 20.

Referring to FIG. 3, the shaft 12 defines a spline 30 that extends between the first shaft end 22 and the second shaft end 24 along the longitudinal axis 20. The spline 30 includes a first spline or a first tooth 32 having a first tip 34, a second spline or a second tooth 36 having a second tip 38, a third spline or a third tooth 40 having a third tip 42, and a fourth spline or a fourth tooth 44 having a fourth tip 46. The first tooth 32 is spaced apart from the second tooth 36 and defines a first pair of adjacent teeth. The third tooth 40 is spaced apart from the fourth tooth 44 and defines a second pair of adjacent teeth. The first pair of adjacent teeth are circumferentially spaced apart from the second pair of adjacent teeth.

A first root 50 is defined between the first pair of adjacent teeth, e.g. the first tooth 32 and the second tooth 36. The first root 50 is disposed parallel to and extends along the longitudinal axis 20. A second root 52 is defined between the second pair of adjacent teeth, e.g. the second tooth 36 and the third tooth 40. The second root 52 is disposed parallel and extends towards the longitudinal axis 20.

Figure 3A:
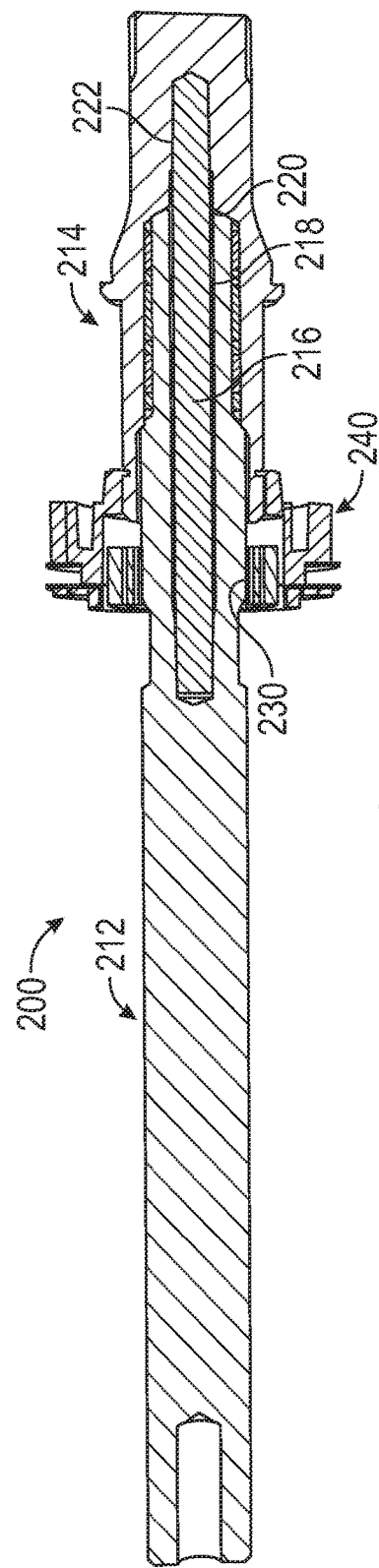
FIG. 3A is a side view of a prior art shaft assembly.

As shown in FIG. 3A, a prior art shaft assembly 200 includes an input shaft 212 that is operatively coupled to a steering wheel (not shown) and rotates in response to rotation of the steering wheel by a user. The input shaft 212 is operatively coupled to an output shaft 214 with a torsion bar 216. The torsion bar 216 imparts a torque on the steering wheel that provides a tactile response to the driver.

The torsion bar 216 is inserted into a cavity 218 of the input shaft 212 and extends through an open end 220 of the input shaft 212 and into a cavity 222 of the output shaft 214. The torsion bar 216 is coupled to the input shaft 212 and the output shaft 214 by press fitting the torsion bar 216 into the cavity 218 and into the cavity 222, respectively.

The input shaft 212 is provided with a stop tooth 230 that extends from an exterior surface of the input shaft 212. The stop tooth 230 engages with the output shaft 214 and engages with a worm gear or a rotor 240. The worm or rotor 240 may be press-fit onto the stop tooth 230 such that the worm or rotor 240 is seated or indexed on the stop tooth 230. The stop tooth 230 may also aid in defining rotational boundaries of the output shaft 214 and/or the worm or rotor 240 relative to the input shaft 212.

Referring back to FIG. 3, the shaft 12 has a constant cross-sectional form between the first shaft end 22 and the second shaft end 24. The constant cross-sectional form of the shaft 12 may be a shaft major diameter 54 or shaft minor diameter 56. The constant cross-sectional form of the shaft 12 eliminates the needs for a rotor assembly mounting bulge or the stop tooth 230 to seat or index a worm, rotor, or rotor assembly.

The shaft major diameter 54 may be measured between tips of the spline 30 that are disposed circumferentially or radially opposite each other. For example, the shaft major diameter 54 may be measured between the first tip 34 of the first tooth 32 or the second tip 38 of the second tooth 36 and the third tip 42 of the third tooth 40 or the fourth tip 46 of the fourth tooth 44.

The shaft minor diameter 56 may be measured between roots of the spline 30 that are disposed circumferentially or radially opposite each other. For example, the shaft minor diameter 56 may be measured between the first root 50 of the first pair of adjacent teeth and the second root 52 of the second pair of adjacent teeth.

The spline 30 may be formed or defined by at least one of a drawing process or an extrusion process such that the shaft 12 has the constant cross-sectional form. The use of the drawing process or the extrusion process creates a continuous spline along a length of the shaft 12. The implementation of the extrusion or drawing process reduces the total piece part price as well as simplifies the shaft 12 design.

Referring to FIGS. 1, 2, and 5-8, the shaft 12 may include a receiving portion 60 that extends from the first shaft end 22 along the longitudinal axis 20. The receiving portion 60 may have a cross-sectional form that is less than the constant cross-sectional form of the shaft 12. The receiving portion 60 is arranged to receive at least one of a steering wheel, another shaft, or another electric power steering assembly component such as a bearing.

Figure 7:
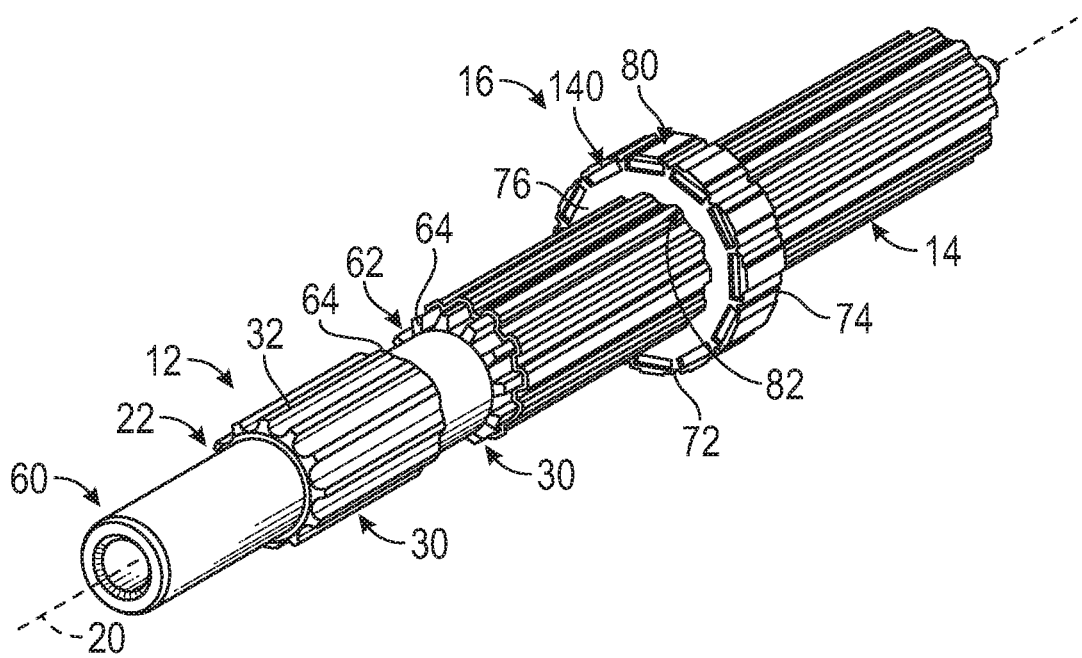
FIGS. 7 and 8 are perspective views of the rotor assembly being installed onto the shaft having the sleeve and a receiving portion.
Figure 8:
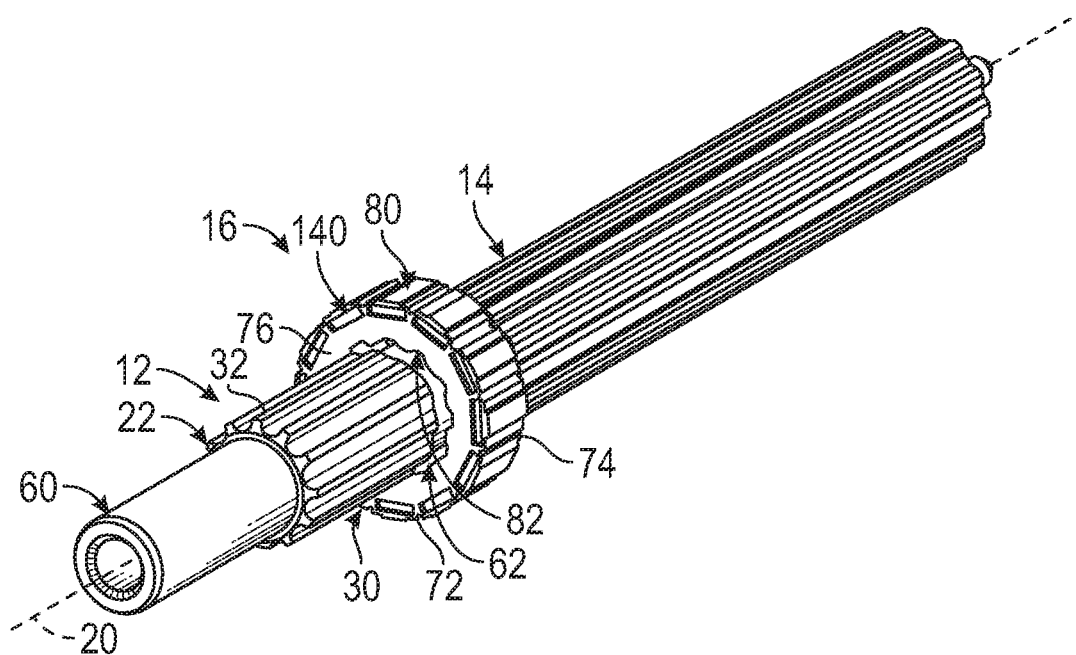

Referring to FIGS. 7 and 8, the shaft 12 may define a recessed region 62 that interrupts the spline 30 such that the spline 30 is not continuous along a length of the shaft 12. The recessed region 62 may be a portion of the shaft 12 that is not provided with splines and has a cross-sectional diameter that is less than a minor diameter of a rotor of the rotor assembly 16. The recessed region 62 is disposed between and is spaced apart from the first shaft end 22 and the second shaft end 24. The rotor assembly 16 to be rotated or positioned, within the recessed region 62, relative to the spline 30 to enable the rotor assembly 16 to be seated on to the spline 30. A portion of the spline 30 that continues after the recessed region 62 is provided with a lead-in or a chamfer 64 to aid a rotor of the rotor assembly 16 in traversing and seating on the spline 30 of the shaft 12.

Referring to FIGS. 2 and 5-9, the sleeve 14 is disposed about a portion of the shaft 12. The sleeve 14 is disposed over a portion of the spline 30 that is disposed proximate the second shaft end 24. The sleeve 14 may be disposed over the first pair of adjacent teeth and the second pair of adjacent teeth as well; the sleeve 14 may extend into the first root 50 and the second root 52. The sleeve 14 extends from the second shaft end 24 towards the first shaft end 22. The sleeve 14 may be an over molded sleeve that acts as a bushing, bearing, or sliding interface that is arranged to facilitate sliding movement of a component of the electric power steering assembly 10 relative to the shaft 12. The sleeve 14 may increase the cross-sectional form of the portion of the shaft 12 over which the sleeve 14 is disposed.

Referring to FIGS. 4-8, the rotor assembly 16 is rotatable about the longitudinal axis 20 and may rotate with the shaft 12. The rotor assembly 16 may be part of an interior permanent magnet motor that is disposed for rotation relative to a stator assembly. In at least one embodiment, the rotor assembly 16 may be part of a sensor assembly that senses the amount of torque or effort that is input into the shaft 12 or senses the rotational position of the shaft 12.

Referring to FIGS. 5-8, the rotor assembly 16 extends axially along the longitudinal axis 20 between a first end 72 and a second end 74. The rotor assembly 16 includes an outer surface 80 that is disposed radially outboard of an inner surface 82. The outer surface 80 and the inner surface 82 axially extend along the longitudinal axis 20 between the first end 72 and the second end 74.

The outer surface 80 defines a plurality of notches 90 and a plurality of bridges or tabs 92. The plurality of notches 90 extend from the outer surface 80 towards the inner surface 82. The plurality of tabs 92 extend away from the outer surface 80 in a direction that extends away from the inner surface 82.

The inner surface 82 engages the spline 30 of the shaft 12 when the rotor assembly 16 is seated on the shaft 12. The inner surface 82 defines a rotor hub spline having a plurality of rotor teeth 100. The plurality of rotor teeth 100 includes a first rotor spline or a first rotor tooth 102 having a first rotor tip 104, a second rotor spline or a second rotor tooth 106 having a second rotor tip 108, and a first rotor root 110.

Figure 4:
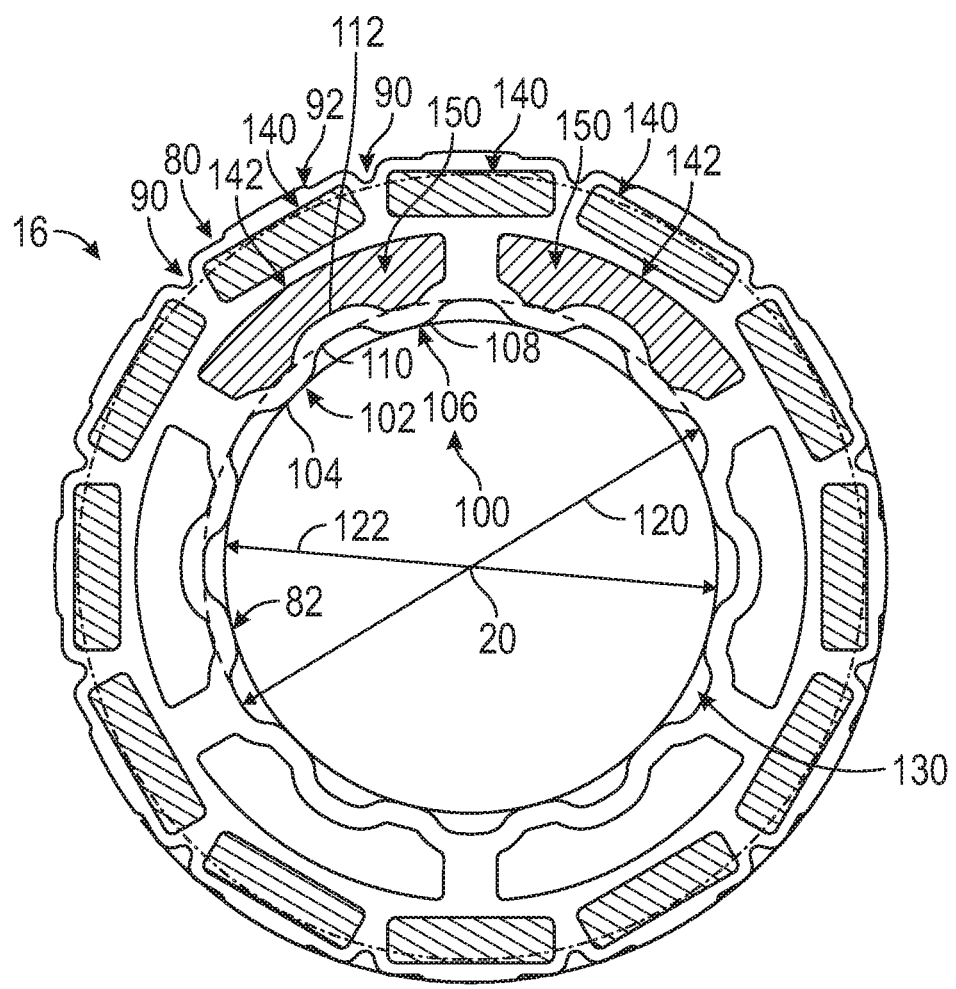
FIG. 4 is an end view of a rotor assembly.

The first rotor tooth 102 is spaced apart from and disposed proximate the second rotor tooth 106. A region that is disposed between the first rotor tooth 102 and the second rotor tooth 106 defines the first rotor root 110. Referring to FIG. 4, the first rotor root 110 extends towards the outer surface 80 and is part of a protrusion, tooth, or protuberance 112 that extends towards the outer surface 80.

The rotor assembly 16 has a rotor major diameter 120 and a rotor minor diameter 122. The rotor major diameter 120 may be measured between roots of the plurality of rotor teeth 100 that are disposed circumferentially or radially opposite each other. The rotor minor diameter 122 may be measured between tips of the plurality of rotor teeth 100 that are disposed circumferentially or radially opposite each other. The rotor minor diameter 122 is greater than the shaft major diameter 54 such that there is an interference fit between the spline 30 of the shaft 12 and the plurality of rotor teeth 100 of the rotor assembly 16 when the rotor assembly 16 is seated on the shaft 12.

Figure 11:
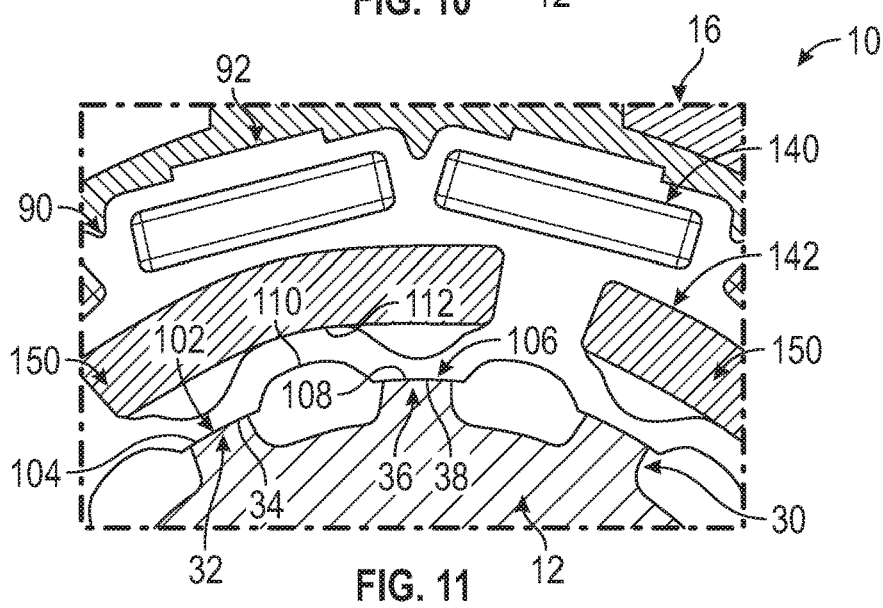

Referring to FIG. 11, the first rotor tip 104 of the first rotor tooth 102 of the plurality of rotor teeth 100 may engage the first tip 34 of the first tooth 32 of the spline 30 and the second rotor tip 108 of the second rotor tooth 106 of the plurality of rotor teeth 100 may engage the second tip 38 of the second tooth 36 of the spline 30 when the rotor assembly 16 is seated on the shaft 12.

Referring to FIG. 4, the inner surface 82 defines an opening 130 through which the shaft 12 is received within or extends through.

The rotor assembly 16 defines a plurality of magnet pockets 140 and a plurality of cavities 142. The plurality of magnet pockets 140 are disposed proximate the outer surface 80. The plurality of magnet pockets 140 are radially disposed between the outer surface 80 and the plurality of cavities 142. The plurality of magnet pockets 140 extend from the first end 72 to the second end 74. The plurality of magnet pockets 140 are each arranged to receive and retain a permanent magnet.

Each notch of the plurality of notches 90 of the outer surface 80 is disposed between and extends between adjacent pockets of the plurality of magnet pockets 140. Each tab of the plurality of tabs 92 of the outer surface 80 is disposed over or aligned with each magnet pocket of the plurality of magnet pockets 140.

The plurality of cavities 142 are disposed proximate the inner surface 82. The plurality of cavities 142 are radially disposed between the plurality of magnet pockets 140 and the inner surface 82. The plurality of cavities 142 extend from the first end 72 towards the second end 74. The plurality of cavities 142 may not extend completely through the rotor assembly 16 and may have a sealed or closed end 76, as shown in FIGS. 7 and 8. Referring to FIG. 4, the protrusion, tooth, or protuberance 112 of the first rotor root 110 extends into a cavity of the plurality of cavities 142.

Adjacent cavities of the plurality of cavities 142 are arranged to receive a tool 150. The tool 150 is arranged to rotate or pivot the rotor assembly 16 about the longitudinal axis 20 to torsionally mate the rotor assembly 16 with the shaft 12. The first rotor tip 104 of the first rotor tooth 102 of the plurality of rotor teeth 100 engages the first tip 34 of the first tooth 32 of the spline 30 and the second rotor tip 108 of the second rotor tooth 106 of the plurality of rotor teeth 100 engages the second tip 38 of the second tooth 36 of the spline 30, when the rotor assembly 16 and the shaft 12 are torsionally mated.

Figure 9:
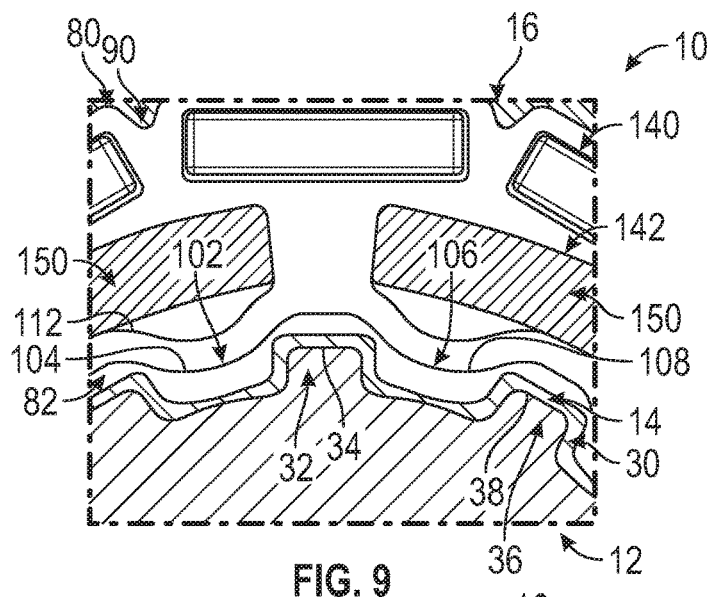
FIGS. 9-11 are end views of the rotor assembly being installed onto the shaft having the sleeve and being torsionally mated to the shaft.
Figure 10:
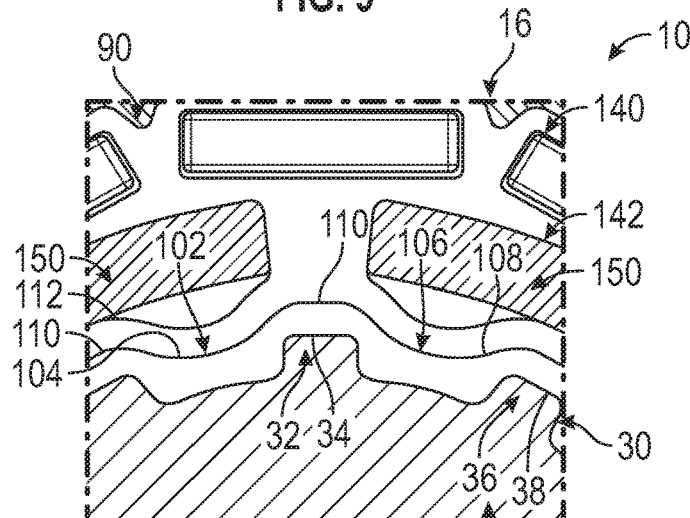

The electric power steering assembly 10 may be at least partially assembled by the following process illustrated in FIGS. 9-11. A shaft blank may be at least one of extruded or drawn through a die to define the spline 30 of the shaft 12. The sleeve 14 may be applied over a portion of the spline 30 such that the sleeve 14 extends from the second shaft end 24 towards the first shaft end 22.

Figure 5:
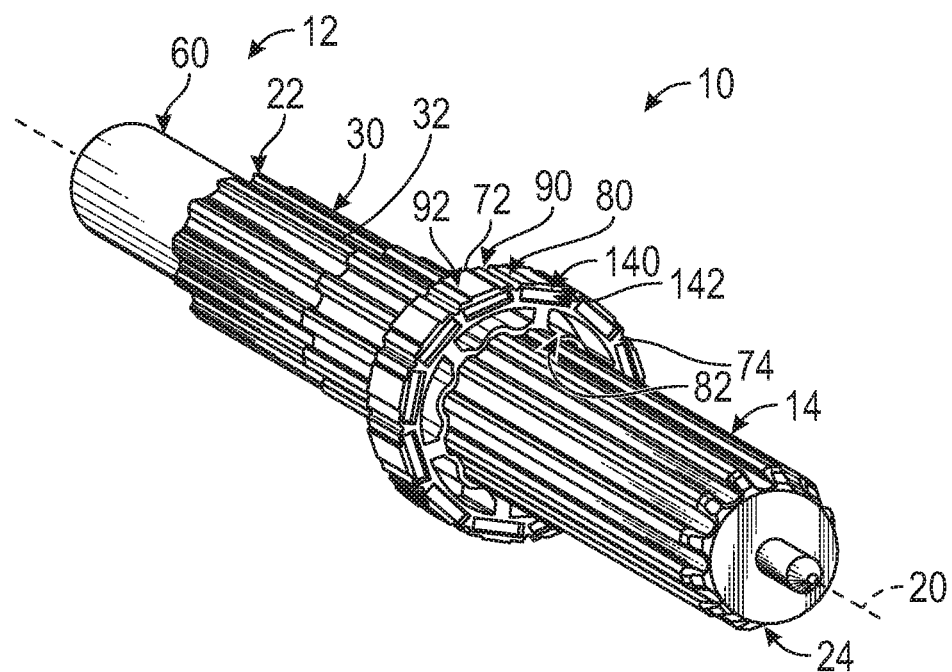
FIGS. 5 and 6 are perspective views of the rotor assembly being installed onto the shaft having the sleeve.

The rotor assembly 16 having a rotor assembly 16 may be provided and may be aligned relative to the shaft 12 such that at least one of the first shaft end 22 or the second shaft end 24 may be inserted into the opening 130 of the rotor assembly 16, as shown in FIG. 9. The rotor assembly 16 may be disposed over the sleeve 14 and the shaft 12, as shown in FIGS. 5, 7, and 9.

The plurality of rotor teeth 100 of the rotor assembly 16 may be aligned relative to the spline 30 of the shaft 12 such that the plurality of rotor teeth 100 of the rotor assembly 16 are out of phase with the spline 30 of the shaft 12. The first tooth 32 is disposed between the first rotor tooth 102 and the second rotor tooth 106, as shown in FIG. 9. In other words, the first tooth 32 is disposed or received within the space between the first rotor tooth 102 and the second rotor tooth 106 such that the rotor assembly 16 may pass over the sleeve 14 and the rotor assembly 16 is able to be moved along the longitudinal axis 20 relative to the shaft 12.

The rotor assembly 16 may be moved relative to the shaft 12 along the longitudinal axis towards a desired location, as shown in FIGS. 5-6, FIGS. 7-8, and 11, due to the tooth to space orientation between the spline 30 of the shaft 12 and the plurality of rotor teeth 100 of the rotor assembly 16.

Figure 6:
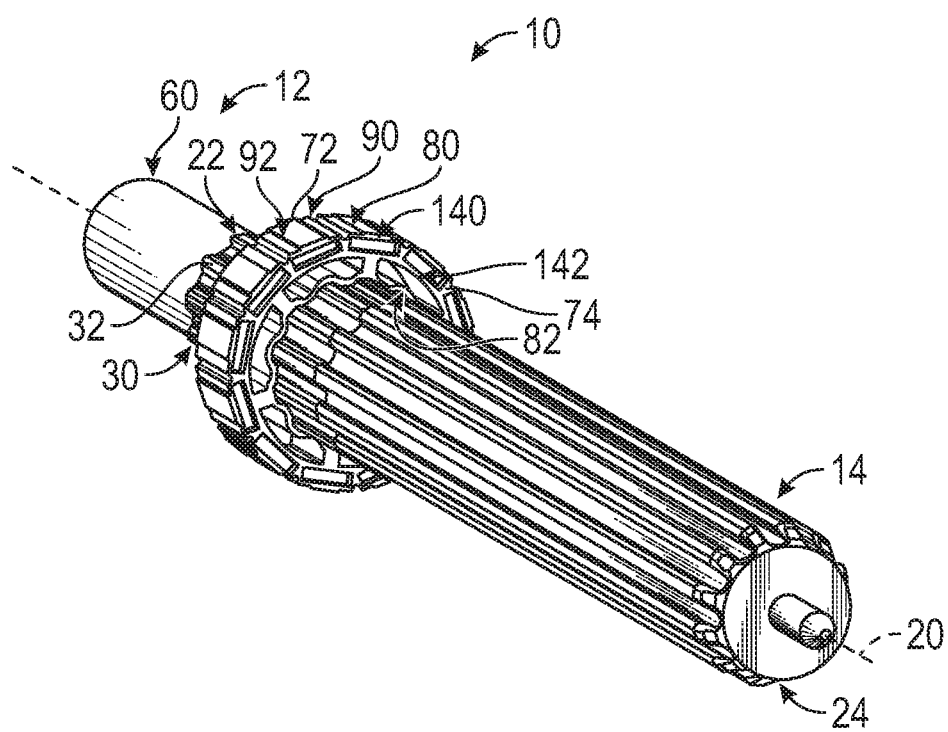

As the rotor assembly 16 approaches the desired location, clearance may be obtained between the spline 30 of the shaft 12 and the plurality of rotor teeth 100 of the rotor assembly 16, as shown in FIG. 10. Referring to FIG. 6, the desired location may be proximate the shaft first end 22. Referring to FIG. 8, the desired location may be proximate the recessed region 62.

The rotor assembly 16 may be axially pressed on to the shaft 12 using the following process. The first tooth 32 may be aligned with at least one of the first rotor tooth 102 or the second rotor tooth 106. The rotor assembly 16 may be axially pressed along the longitudinal axis 20 onto the shaft 12 such that at least one of the first rotor tooth 102 or the second rotor tooth 106 rides along the chamfer 64 and seats on the first tooth 32. The rotor assembly 16 is seated on the shaft 12 such that the first tip 34 engages at least one of the first rotor tip 104 or the second rotor tip 108.

The rotor assembly 16 may be torsionally mated to the shaft 12 using the following process. The tool 150 may be inserted into at least one cavity of the plurality of cavities 142, as shown in FIGS. 4, 9, and 10. The tool 150 may rotate the rotor assembly 16 about the longitudinal axis 20 relative to the shaft 12 such that the plurality of rotor teeth 100 of the rotor assembly 16 becomes in phase with the spline 30 of the shaft 12 to torsionally mate the rotor assembly 16 to the shaft 12, as shown in FIG. 11.

Torsionally mating the rotor assembly 16 with the shaft 12 may be referred to as a twist press operation. Torsionally mating the rotor assembly 16 to the shaft 12 includes rotating the rotor assembly 16 relative to the shaft 12 and or rotating the shaft 12 relative to the rotor assembly 16 such that there is tooth to tooth contact between the spline 30 and the plurality of rotor teeth 100.

The rotor assembly 16 may continue to be rotated relative to the shaft 12 about the longitudinal axis 20 such that the first tip 34 of the first tooth 32 engages or is disposed on the first rotor tip 104 of the first rotor tooth 102 and the second tip 38 of the second tooth 36 engages or is disposed on the second rotor tip 108 of the second rotor tooth 106. The engagement between the tips of the rotor teeth 100 and the tips of the splined 30 creates a tooth-to-tooth interference fit that locks the shaft 12 and the rotor assembly 16 together.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

Having thus described the invention, it is claimed:

1. An electric power steering assembly, comprising:
a shaft extending along a longitudinal axis between a first shaft end and a second shaft end, the shaft defining a spline that extends between the first shaft end and the second shaft end, the spline having a plurality of spline teeth spaced from one another by a plurality of spline roots; and
a sleeve having an annular wall disposed over a portion of the spline and extending from the second shaft end towards the first shaft end, the annular wall having a substantially uniform wall thickness following an outer contour of the spline in undulating fashion over the plurality of spline teeth and into the spline roots; and a rotor assembly that is seated on the shaft, the rotor assembly comprising:
a rotor hub having an outer surface and an inner surface that is configured to be disposed over the sleeve and engage the spline of the shaft.

2. The electric power steering assembly of claim 1, wherein the spline is defined by at least one of a drawing process or an extrusion process.

3. The electric power steering assembly of claim 1, wherein the shaft has a shaft major diameter measured between tips of the spline that are disposed circumferentially opposite each other.

4. The electric power steering assembly of claim 1, wherein the shaft has a shaft minor diameter measured between roots of the spline that are disposed circumferentially opposite each other.

5. The electric power steering assembly of claim 4, wherein the shaft includes a receiving portion that extends from the first shaft end along the longitudinal axis.

6. The electric power steering assembly of claim 5, wherein the receiving portion has a diameter that is less than the shaft minor diameter.

7. The electric power steering assembly of claim 1, wherein the inner surface defines a plurality of rotor teeth spaced from one another by a plurality of rotor roots, the rotor teeth having rotor tips and the spline teeth having spline tips, wherein the rotor tips are arranged to engage the spline tips of the shaft such that the spline roots and the rotor roots are in facing relation with one another.

8. The electric power steering assembly of claim 1, wherein the rotor assembly is part of a sensor assembly that senses at least one of torque input into shaft and a rotational position of the shaft.

* * * * *